Oct. 6, 1959     H. P. KALMUS     2,907,835
CAPACITIVE TRANSDUCER

Filed Aug. 13, 1954     2 Sheets-Sheet 1

INVENTOR.
Henry P. Kalmus
BY
Max L. Libman
Attorney

Oct. 6, 1959    H. P. KALMUS    2,907,835
CAPACITIVE TRANSDUCER
Filed Aug. 13, 1954    2 Sheets-Sheet 2
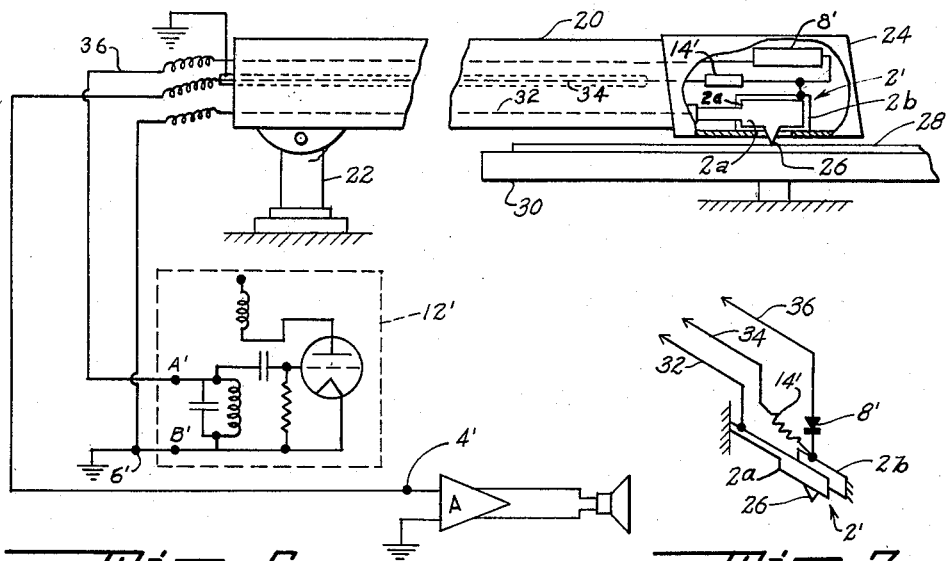
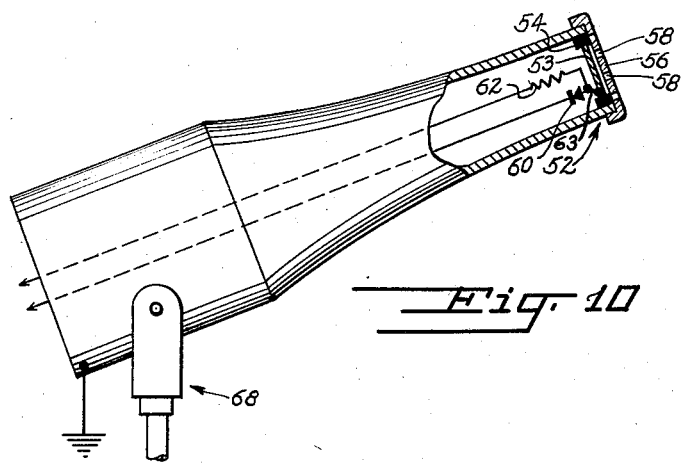
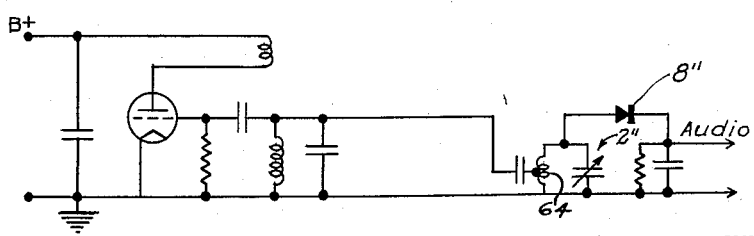
INVENTOR.
Henry P. Kalmus
BY Max L. Libman
Attorney United States Patent Office 2,907,835
Patented Oct. 6, 1959

2,907,835
CAPACITIVE TRANSDUCER
Henry Paul Kalmus, Washington, D.C.
Application August 13, 1954, Serial No. 449,604
8 Claims. (Cl. 179—100.4)

This invention relates to a capacitive transducer system for translating mechanical movement or displacement into electrical signals whose instantaneous variations are a function of the instantaneous variations in mechanical displacement which it is desired to measure or reproduce. An example of such a device is a phonograph pickup, a microphone for translating speech into electrical signals, etc.

In all mechano-electrical transducers it is necessary that the motion of a mechanical mass be related directly to the desired motion and be transferred into the variation of an electrical parameter of an electric circuit. For this reason, the use of a capacitor element as a transducer appears attractive, since in this case, the moving part, functioning as one plate of a condenser, may be of very small dimensions, and is required to carry only an electrical charge or a very small alternating current, whereas in other types of transducers either magnetic flux or a strong current has to be passed by the element in motion. The small mass makes it possible to design phonograph pickups or microphones with very low mechanical impedance and good frequency response. Unfortunately, capacitive transducers are high electrical impedance devices because of their inherent small internal capacity, so that there is difficulty in matching the output of such a device to a suitable amplifier system for efficient operation. In previous known systems employing capacitive transducers, either the grid resistor of the first amplifier tube must be made extremely high, or the capacitor variations must be converted into phase or frequency changes. The first of these alternatives is hum sensitive and therefore requires careful and expensive shielding, also it is sensitive to humidity and requires further protection against this factor. The second method is dependent on the operation of tuned elements, so that it is difficult to achieve long time stability and freedom from distortion, since very small changes in the electrical values of the circuit will produce serious distortion.

It is a primary object of my invention to obviate the above disadvantages in a capacitive transducer. This is accomplished by transforming the effective impedance of the capacitive transducer to a low value by the use of a rectifier with low capacitance.

Another object of my invention is to provide a capacitive transducer of high available output, high signal-to-noise ratio, and linear frequency characteristic. A further object is to provide a capacitive transducer which requires no servicing during normal operating life, and requires no particular precaution or protection against humidity. It is a particular advantage of my invention that no long heavily shielded cables are required, and that the small changes in circuit constants which inevitably occur with time produce no significant deterioration in operation.

Another advantage of my invention is that it makes possible a simple balanced action of the type wherein a central movable capacitor plate vibrates between two fixed plates with all of the advantages of this type of capacitive transducer element.

Still another object is to provide a high quality condenser microphone or phonograph pickup which can be built ruggedly to withstand severe service conditions and yet maintain extremely high quality output under all conditions.

The specific nature of my invention, as well as other objects and advantages thereof, will clearly appear from a description of a preferred embodiment as shown in the accompanying drawings in which:

Fig. 7 is a schematic perspective of the transducer elements of Fig. 6 showing more clearly their relationship;

Fig. 8 is a schematic diagram of another form of the invention using a balanced circuit arrangement;

Fig. 10 is a schematic drawing, partly in section, of the invention as applied to a microphone; and Fig. 11 is a schematic circuit diagram of the invention applied to a conventional resonant tuned circuit.

Figure 1:
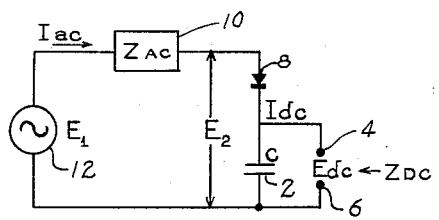
Fig. 1 is a schematic circuit diagram showing the principle of the invention.

Referring to Fig. 1, the principle of the invention will be explained. The invention is applicable to any known type of capacitive pickup represented at 2 as a variable capacitor having a capacity C. The voltage across this capacitor, appearing at terminals 4 and 6, will be labelled "$E_{dc}$" for future reference. In series with the capacitor are a rectifier 8, an impedance 10, and an A.-C. generator 12. The rectifier 8 may be either of the germanium diode type or may be a vacuum tube diode. Impedance 10 is assumed to present a real alternating current impedance value of $Z_{ac}$ to the fundamental frequency and a short circuit, in effect, for all its harmonics and for the direct current, e.g., a resonant circuit tuned to the fundamental frequency. The capacitor 2 is assumed to be sufficiently large to short circuit the alternating current of the fundamental and all of its harmonic frequencies, so that peak rectification takes place. The generator 12 may be a relatively high frequency oscillator with very small internal impedance, as will be described later, and is assumed to have an effective voltage output of $E_1$, and to cause an alternating current flow $I_{ac}$. With reference to the voltages indicated in Fig. 1, the following conditions prevail:

$$E_{dc} = E_2\sqrt{2}$$

$$I_{dc} = I_{ac}\frac{\sqrt{2}}{2}$$

where $I_{ac}$ is the effective value of the fundamental component of the current and $I_{dc}$ is the D.-C. component.

Figure 2:
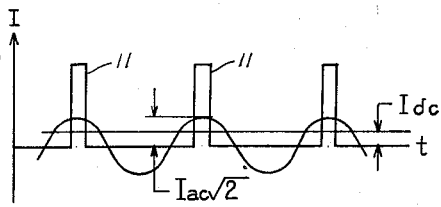
Fig. 2 is a wave-form graph used in connection with Fig. 1.

This is explained in Fig. 2. In a peak-rectifier, the current consists of very short pulses. Fourier analysis shows that the fundamental component of this current has a peak value twice the D.-C. component independent of the shape of the pulses.

In normal operation, with a constant value of the capacitor 2, the capacitor will charge up to peak value of $E_2$, and remain at that level except for the leakage through the load across terminals 4 and 6 (or in practice through the back resistance of diode 8). Thereafter, the diode will conduct only near the voltage peaks of the generator and only at a level which will replace the amount of charge which leaks off during each cycle. The result is a series of peaks as shown at 11 in Fig. 2, while the D.-C. voltage at terminals 4 and 6 remains nearly constant. This, of course, assumes that the capacity of the condenser 2 remains constant during the time under consideration.

Returning to Fig. 1:

$$E_2 = E_1 - I_{ac}Z_{ac}$$

$$E_2 = \frac{E_{dc}}{\sqrt{2}}; \quad I_{ac} = \frac{2I_{dc}}{\sqrt{2}}$$

$$E_{dc} = E_1\sqrt{2} - 2I_{dc}Z_{ac}$$

$$Z_{dc} = \frac{dE_{dc}}{dI_{dc}} = -2Z_{ac}$$

This means that the circuit behaves like a D.-C. generator with an internal impedance equal to twice the A.-C. impedance.

This theorem can also be proved in another way. Assuming that the rectifier is lossless, the available D.-C. power must equal the available A.-C. power. The open-circuit A.-C. voltage is $E_1$. The open-circuit D.-C. voltage is $E_1\sqrt{2}$. Hence:

$$\frac{E_1^2}{4Z_{ac}} = \frac{2E_1^2}{4Z_{dc}}$$

and $$Z_{dc} = 2Z_{ac}$$

Figure 3:
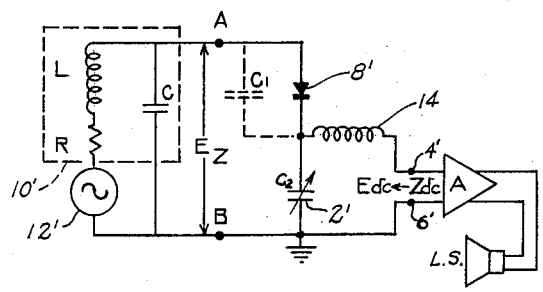
Fig. 3 is a schematic circuit diagram of one form of the invention.

A diagrammatic representation of the invention as applied to a capacitive transducer is shown in Fig. 3. Elements 10' and 12' taken together represent a high frequency oscillator with an internal alternating current impedance $$Z_{ac} = \frac{L}{CR}$$

$C_1$ is the parallel-capacity of the diode 8'. At 14 is a choke with a very high R.F. impedance. Let it be assumed that $C_2$ is the variable capacity formed by the armature of the phonograph pickup 2'. In this case, $C_2$ will in practice have a value of about 1 $\mu\mu$f. and it is modulated by about 1%. If the diode capacity $C_1$ is also 1 $\mu\mu$f., a voltage $$E_{dc} = \frac{E_2}{\sqrt{2}}$$

is developed across $C_2$.

Now, if $C_2$ is varied by 1%, the A.-C. voltage across the diode is modulated by ½% so that $E_{dc}$ is changing by ½% at modulation rate.

The condensers $C_1$ and $C_2$ form an A.-C. voltage divider so that the effective internal A.-C. impedance of the device is ¼$Z_{ac}$. Using our theorem, the internal D.-C. impedance of the device is:

$$Z_{dc} = \frac{1}{2}Z_{ac}$$

Again, this relation can be shown to be true by the available-power theory:

$$P_{ac} = \frac{E_2^2}{4Z_{ac}}$$

The available D.-C. power (with the diode working) is:

$$P_{ac} = \frac{\left(\frac{E_2}{2}\sqrt{2}\right)^2}{4Z_{dc}}$$

Hence, $$Z_{dc} = \frac{1}{2}Z_{ac}$$

Figure 4:
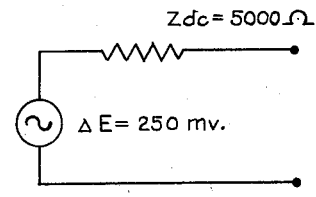
Figs. 4 and 5 are equivalent impedance circuit diagrams used to illustrate the impedance characteristics of the invention.

Assuming a D.-C. voltage of $E_{dc} = 50$ v., a 1% mechanical modulation produces $\Delta E = 250$ mv. voltage change. Assuming an internal A.-C. impedance of $Z_{ac} =$ 10,000 ohms, the D.-C. impedance of the device is $Z_{dc} =$ 5,000 ohms. Hence the device is equivalent to an audio generator with an open circuit voltage of 250 mv. and with an internal impedance of 5,000 ohms as shown in Fig. 4.

Figure 5:
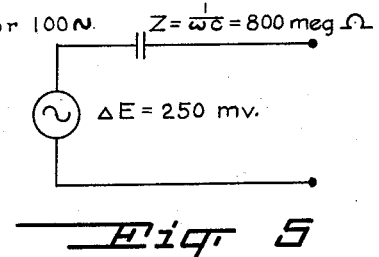

The equivalent circuit of the conventional D.-C. operation of a capacitive transducer is shown in Fig. 5. Assuming the same voltage as before, $E_{dc} = 50$ v. across the transducer, we again obtain an open-circuit voltage of 250 mv. for a capacitive change of 1%. The internal impedance, however, is now the impedance of a 2 $\mu\mu$f. condenser for, say, 100 cycles.

$$Z = \frac{1}{\omega C} = 800 \text{ megohms}$$

For lower frequencies the impedance is correspondingly higher. This shows why in the conventional arrangement as previously used in the art special input tubes with low grid current have to be employed. The input capacity must either be very low or trick circuits have to be used for reducing the capacity by negative feedback; the high internal impedance makes the device very sensitive to hum and humidity so that extensive shielding is required.

All these drawbacks are avoided by the described impedance transformation method although the conditions shown are idealized. The rectifier has a definite forward and backward resistance so that the real internal D.-C. impedance is higher than the calculated one. In an experimental setup, a measured value of 7,000 ohms was obtained as against the theoretical value of 5,000 ohms, an increase which is negligible if compared with a conventional transducer impedance of hundreds of megohms.

In practice, with a phonograph pickup based on a circuit as shown in Fig. 3, the very satisfactory signal-to-noise ratio of 65 db was obtained.

Figure 6:
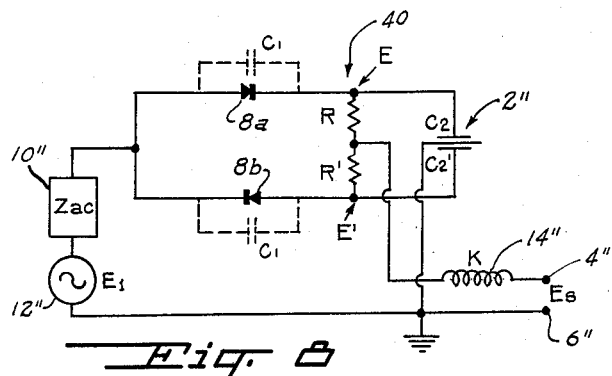
Fig. 6 is a schematic drawing showing a physical embodiment of the invention.

Figs. 6 and 7 show the physical relationship of the parts in such an embodiment. The tone arm 20 is rotatably mounted on spindle 22 in the usual fashion and bears the head 24 at its extremity, in which are housed the capacitive transducer 2', one plate 2a of which is rigidly fastened to needle or stylus 26 which follows the grooves of record 28 rotating on turntable 30, while the other plate 2b is fixed to the head 24. Transducer 2' is connected between point 6', corresponding to the terminal of the same reference number of Figs. 1 and 2, and terminal 4' by means of leads 32 and 34 which extend along the tone arm. Impedance 14' corresponds to inductor 14 of Fig 3, but may in practice be a resistor of suitable value; this is preferable because of the lower expense and smaller size. Diode 8' is a germanium or silicon diode connected at one end to the capacitor 2' and at the other end by lead 36 to the oscillator 12'. Lead 36 is preferably moderately shielded.

Oscillator 12' will in practice be housed with the circuit elements of the conventional phonograph amplifier, but is shown as a separate unit in Fig. 6 for convenience. Terminals A' and B' of the oscillator 12' correspond to points A and B of Fig. 3. A conventional tickler-coil oscillator is shown, but any other known oscillator circuit may be employed.

A balanced circuit arrangement is shown in Fig. 8. This is of advantage in minimizing noise. There are two noise sources in the general case:

(1) Amplitude modulation noise of the oscillator; and
(2) Rectifier noise.

Amplitude modulation noise can be supressed almost entirely by the use of a balanced detector circuit, as shown in Fig. 8. At the same time, rectifier noise is reduced in this way by 3 db and much better linearity of the amplitude response is obtained, with less dependence on accuracy of gap spacing.

Referring to Fig. 8, the transducer 2" consists of a balanced condenser whose respective capacities will be denoted by $C_2$ and $C_2'$; the center plate or conductor is movable so that, while $C_2$ is increased, $C_2'$ is decreased. In this way, the distortion is greatly reduced because of the cancellation of even harmonics. Balanced condenser $2''$ is connected across potential divider 40 preferably comprising two equal resistors of value $R=R'$, their common point being connected to output terminal $4''$ through a suitable isolating impedance $14''$. Other circuit elements bear the same reference numerals as before, with double-primes ('') added.

Figure 9:
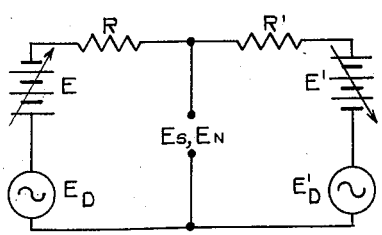
Fig. 9 is an equivalent circuit diagram corresponding to a portion of Fig. 8 to show the improvement in signal-to-noise ratio.

Fig. 9 is a schematic circuit for the purpose of analysis equivalent to Fig. 8. The voltages E and E' represent the respective unidirectional signal voltages appearing across the resistors R and R' respectively, while the voltages $E_D$ and $E'_D$ represent noise voltages which detract from the performance.

It is assumed that voltage conditions are the same as for the circuit in Fig. 8, so that, for a deflection of the center-conductor by a certain amount the same $\Delta E$ is produced by either rectifier. Hence:

$$E = E_0 + \Delta E$$
$$E' = -(E_0 - \Delta E)$$

The rectifier noise source may be represented by noise voltages $E_d$ and $E_d'$ generated by the diodes.

The resulting signal and noise voltages, $E_s$ and $E_n$ can be calculated. Assuming the resistors R and R' to be equal:

$$E_s = \tfrac{1}{2}(E+E') = \tfrac{1}{2}(E_0+\Delta E) - (E_0-\Delta E) = \Delta E$$

The signal voltage is the same as the one obtained from the circuit in Fig. 3. Any undesired amplitude modulation of the oscillator E, however, is now almost cancelled.

In order to find the resulting noise voltage, we must add the root means square values of the individual voltages:

$$E_n = \tfrac{1}{2}\sqrt{E_d^2 + E_d'^2}$$

for $$E_d = E_v': E_n = \frac{E_d}{\sqrt{2}}$$

This corresponds to an improvement of the signal-to-noise ratio by 3 db, which is provided by the arrangement of Fig. 8.

In designing the above circuits, certain considerations should be noted, which will be discussed below.

Inspecting the circuit in Fig. 3, it can be seen that the maximum possible modulation of the high frequency carrier is obtained for $$C_1 = C_2$$

The capacity $C_2$ is the transducer capacity itself. Any additional stray capacity of $C_2$ should be avoided in order to obtain a maximum capacity change by the motion of the conductor. For a phonograph pickup, for example, $C_2 = 1$ $\mu\mu f$. Hence, $C_1$ must be kept as small as possible and it must be mounted in close vicinity to the transducer itself. This can best be accomplished by the use of a germanium or silicon diode, soldered directly to the terminal for the moving transducer element. The choke K should add as little stray capacity as possible and can, in a practical design, be replaced by an isolating resistor.

The high frequency generator can be mounted at any place. Its frequency should be high enough so that $C_1+C_2$, which act as a bypass for the RF frequency and all its harmonics, should have the highest possible susceptance. This way, peak rectification is obtained.

Fig. 10 shows the invention applied to a microphone. The condenser 52 is formed by a flexible conductive diaphragm 53 mounted in insulating support 54 and a fixed metal grid 56 which is provided with a number of apertures 58 to permit access of sound to the diaphragm 53. Rectifier 60 and isolating resistor 62 are connected to the diaphragm 53 through a lead 64. The casing 66 is grounded to complete the circuit which is otherwise the same as in Fig. 6. The microphone may be mounted on a conventional swivel mounting 68 supported on any suitable type of stand.

Whereas it is possible to employ vacuum diodes, this solution is not recommended because of the necessity of bringing up the heater leads all the way to the transducer. Modern silicon junction diodes have a very high back resistance and the noise voltage is low as long as the Zener-voltage is not reached. If diodes with very low capacity are not available or if the Zener-voltage is too low, two or more diodes in series connection can be employed. If desired, a frequency discriminator can be used in connection with the low capacity diode, as in previously known capacitive transducer circuits. However, by using the arrangement of the present invention, a wider frequency swing can be obtained than with a conventional design in which the transducer capacity is shunted by large stray capacities.

Fig. 11 is a schematic circuit diagram showing an example of the invention applied to a conventional capacitive transducer circuit in which the tuning of a resonant circuit is affected by the capacity variations. The general circuit arrangement is well known, and as previously noted is subject to the disadvantage that it requires very accurate tuning which is difficult to maintain over long periods in a practical device. However, such systems can be used with proper precautions, and their operation is improved by using a rectifier in the arrangement of the invention. Note that in all cases the rectifier $8'''$ is mounted physically very close to the capacitive transducer $2'''$ and this is, of course, an essential feature of the invention, in accordance with the design considerations previously noted, as it is necessary to keep the stray capacitance of the system to a minimum in order to obtain a maximum relative capacitance change by the motion of the capacitor plate. Either the discriminator or the oscillator itself can be modulated. A system of this kind, however, still requires readjustments of the tuning elements from time to time.

The low capacitance rectifier, together with coil 64, are mounted in close proximity to the transducer. The tuned circuit formed by coil 64 and the transducer capacity in parallel with the rectifier capacitance is slope-tuned so that it acts as a discriminator. In this way, maximum frequency swings are obtained for changes of the transducer capacity. In conventional designs, the rectifier is mounted in the phonograph chassis so that a long, high capacity lead is required for connecting the transducer with the discriminator or oscillator. This has the disadvantage that the effect of the changing transducer capacity is greatly reduced so that critical circuits with narrow band-width become necessary to produce the desired signal-to-noise ratio.

It will be apparent that the embodiments shown are only exemplary and that various modifications can be made in construction and arrangement within the scope of my invention as defined in the appended claims.

I claim:

1. A capacitive transducer system comprising a tuned radio-frequency source of negligible R-F impedance, a low-capacity rectifier and a variable capacitive mechanical transducer having a capacitance of the same order of magnitude as the rectifier, low-impedance leads connecting said rectifier and transducer directly in series with said source and with each other, signal responsive amplifier circuit means connected across said capacitive transducer for producing an amplified signal corresponding to mechanical movements of said transducer.

2. A low impedance capacitive transducer system comprising capacitive transducer means having a definite small normal value of capacitance in the unmodulated condition, a rectifier and a high frequency oscillator of negligible impedance at the output frequency in series with said capacitive transducer, said rectifier having a capacitance substantially equivalent to the normal capacitance of said capacitive transducer, means for varying the capacity of said transducer at audio frequencies, output terminals connected across said capacitive transducer, and an isolating impedance of negligible capacitance in series with said output terminals and said capacitive transducer.

3. A low impedance capacitive transducer system comprising a balanced capacitive transducer having two relatively fixed plates and a relatively movable plate between them normally biased to a central balanced position, a series arrangement of at least two rectifiers and a potential divider connected in series, said fixed plates being respectively connected to the opposite ends of said potential divider, an oscillator having two output terminals, one of said terminals being connected to the common junction of said two rectifiers and the other being connected to said movable plate, and two low impedance output terminals, one connected to an intermediate point of said potential dividers and the other to said movable plate.

4. The invention according to claim 3, and an isolating impedance in series with said low impedance terminals and said capacitive transducer.

5. The invention according to claim 4, said isolating impedance being an inductance element.

6. For use with conventional audio amplifier and speaker system, a low impedance phonograph pickup of the capacity type having fixed plate means and relatively movable plate means, a phonograph needle attached to said movable plate means, low capacitance rectifier means connected in series circuit with said phonograph pickup, a radio-frequency oscillator having its output of negligible impedance at the output frequency connected to said phonograph pickup through said rectifier means, and audio output leads connected respectively to the fixed and movable plate means of said phonograph pickup.

7. The invention according to claim 6, said rectifier means having a capacitance substantially equivalent to that of the capacitive transducer, said rectifier means being mounted physically close to said capacitive transducer to minimize stray capacitance.

8. The invention according to claim 1, and circuit means connecting said rectifier and transducer in close proximity to each other to minimize stray capacitance.

References Cited in the file of this patent

UNITED STATES PATENTS

| | | |
|---|---|---|
| 2,395,390 | Antalek | Feb. 26, 1946 |
| 2,481,886 | Sinnett | Sept. 13, 1959 |
| 2,507,188 | Weathers | May 9, 1950 |
| 2,522,870 | Hammond | Sept. 19, 1950 |
| 2,532,060 | Dicke | Nov. 28, 1950 |

FOREIGN PATENTS

| | | |
|---|---|---|
| 594,077 | Great Britain | Nov. 3, 1947 |